United States Patent
van Wageningen et al.

(10) Patent No.: US 9,735,583 B2
(45) Date of Patent: Aug. 15, 2017

(54) METHODS, TRANSMISSION DEVICES AND TRANSMISSION CONTROL SYSTEM FOR TRANSMITTING POWER WIRELESSLY

(75) Inventors: Andries van Wageningen, Eindhoven (NL); Antonius Adriaan Maria Staring, Eindhoven (NL); Achim Hilgers, Aachen (DE); Eberhard Waffenschmidt, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 942 days.

(21) Appl. No.: 13/201,660

(22) PCT Filed: Feb. 10, 2010

(86) PCT No.: PCT/IB2010/050597
§ 371 (c)(1),
(2), (4) Date: Aug. 16, 2011

(87) PCT Pub. No.: WO2010/097725
PCT Pub. Date: Sep. 2, 2010

(65) Prior Publication Data
US 2011/0298297 A1 Dec. 8, 2011

(30) Foreign Application Priority Data
Feb. 27, 2009 (EP) .................... 09153863

(51) Int. Cl.
*H01F 27/42* (2006.01)
*H01F 37/00* (2006.01)
(Continued)

(52) U.S. Cl.
CPC .............. *H02J 5/005* (2013.01); *H02J 7/00* (2013.01); *H02J 7/02* (2013.01)

(58) Field of Classification Search
CPC ...... H02J 7/00; H02J 7/02; H02J 5/005; H02J 7/025; H02P 9/04; H01F 38/14;
(Continued)

(56) References Cited

U.S. PATENT DOCUMENTS 6,047,214 A 4/2000 Mueller
6,889,905 B2 5/2005 Shigemasa
(Continued)

FOREIGN PATENT DOCUMENTS

JP 2006011865 A 1/2006
WO WO2004068726 A2 8/2004
(Continued)

*Primary Examiner* — Rexford Barnie
*Assistant Examiner* — Jagdeep Dhillon
(74) *Attorney, Agent, or Firm* — Larry Liberchuk

(57) ABSTRACT

This invention proposes a method of and a device for transmitting power via electromagnetic coupling from a transmission device to a set of reception devices, said method comprising a step of calculating by the transmission device, a first sum of given power levels defined by each reception device of said set of reception devices; if a maximum power that can be transmitted by the transmission device to said set of reception devices is less than said first sum, then performing a step of determining by said transmission device, based on said first sum and according to a set of criteria, a subset of reception devices among said set of reception devices, to which the transmission device transmits power.

15 Claims, 3 Drawing Sheets

(51) Int. Cl.
  *H01F 38/00* (2006.01)
  *H02J 5/00* (2016.01)
  *H02J 7/00* (2006.01)
  *H02J 7/02* (2016.01)

(58) Field of Classification Search
  CPC ......... H01J 17/00; B60L 11/182; H04B 1/16; G08B 1/08; H05K 1/02; H02H 9/00
  USPC ......... 307/9.1, 104, 149; 320/101, 104, 253, 320/163, 103, 108, 124; 340/539.1; 455/343.1; 174/268; 361/18; 439/884
  See application file for complete search history.

(56) References Cited

U.S. PATENT DOCUMENTS

| | | | |
|---|---|---|---|
| 7,262,700 B2 | 8/2007 | Hsu | |
| 8,603,687 B2* | 12/2013 | Hamada | B60L 1/003 307/18 |
| 2002/0113441 A1* | 8/2002 | Obayashi | H02J 1/14 290/40 C |
| 2003/0214255 A1 | 11/2003 | Baarman | |
| 2004/0130915 A1 | 7/2004 | Baarman | |
| 2004/0142733 A1 | 7/2004 | Parise | |
| 2005/0007067 A1* | 1/2005 | Baarman | H01F 5/02 320/108 |
| 2005/0068019 A1* | 3/2005 | Nakamura | G06F 1/26 323/355 |
| 2005/0117633 A1* | 6/2005 | Schmidt | G06F 1/08 375/219 |
| 2005/0127867 A1 | 6/2005 | Calhoon | |
| 2006/0113955 A1 | 6/2006 | Nunally | |
| 2007/0042729 A1 | 2/2007 | Baarman | |
| 2007/0069686 A1* | 3/2007 | Graeber | H02J 7/0004 320/106 |
| 2007/0135178 A1* | 6/2007 | Albulet | G06F 3/0383 455/574 |
| 2007/0171681 A1* | 7/2007 | Baarman | A61L 2/10 363/16 |
| 2007/0225026 A1* | 9/2007 | Bennett | H04W 52/04 455/522 |
| 2008/0014897 A1* | 1/2008 | Cook | H02J 17/00 455/343.1 |
| 2008/0164770 A1* | 7/2008 | Terlizzi | B21C 23/18 307/125 |
| 2008/0197804 A1 | 8/2008 | Onishi | |
| 2008/0221555 A1* | 9/2008 | Sheppard | A61B 1/041 604/890.1 |
| 2008/0315826 A1* | 12/2008 | Alberth, Jr. | H02J 7/0013 320/101 |
| 2009/0008753 A1* | 1/2009 | Rofougaran | H04L 12/40013 257/660 |
| 2009/0079263 A1* | 3/2009 | Crumm | H02J 1/14 307/43 |
| 2009/0096413 A1* | 4/2009 | Partovi | H01F 5/003 320/108 |
| 2009/0236140 A1* | 9/2009 | Randall | H01R 13/03 174/268 |
| 2009/0284220 A1* | 11/2009 | Toncich | G06K 7/0008 320/108 |
| 2009/0284369 A1* | 11/2009 | Toncich | G06K 7/0008 340/539.3 |
| 2010/0022204 A1* | 1/2010 | Rofougaran | H01P 1/20372 455/90.2 |
| 2010/0079116 A1* | 4/2010 | Thivierge et al. | 320/153 |
| 2010/0195547 A1* | 8/2010 | Vice | H03F 1/0277 370/311 |
| 2011/0133570 A1* | 6/2011 | Mayo | H03F 3/2176 307/104 |

FOREIGN PATENT DOCUMENTS

| | | |
|---|---|---|
| WO | WO2004073166 A2 | 8/2004 |
| WO | WO2007020583 A2 | 2/2007 |
| WO | WO2007090168 A2 | 8/2007 |
| WO | WO2008137996 A1 | 11/2008 |
| WO | WO2010135785 A1 | 12/2010 |

\* cited by examiner

METHODS, TRANSMISSION DEVICES AND TRANSMISSION CONTROL SYSTEM FOR TRANSMITTING POWER WIRELESSLY

FIELD OF THE INVENTION

The present invention relates to methods, transmission devices and transmission control system for transmitting power via electromagnetic coupling.

BACKGROUND OF THE INVENTION

Many systems require wiring and/or electrical contacts to realize the supply of electrical power to devices. By omitting these wires and contacts the use of these devices becomes more comfortable. The use of batteries inside devices partly meets this comfort requirement, but gives a device extra weight and requires regular recharging. Power transmission via magnetic induction is a well-known method, mostly applied in transformers, but is recently refined by integrating coils into printed circuit boards (PCBs) or other flat materials, enabling wireless power transmission from a surface to a reception device. For this purpose a power supply can be equipped with a transmitter that can generate an alternating magnetic field by means of an alternating electrical current in one or more coil(s) and a mobile device can be equipped with a reception device in which an alternating electrical voltage is induced in one or more coils by this magnetic field.

To efficiently and safely provide wireless power from a power supply with multiple transmitter elements, it is necessary to detect and locate a reception device when it is near the surface of the power supply and to activate only those transmitter elements that are within the area that is covered by the reception device coil.

To further increase the efficiency and safety, transmitter and reception device communicate with each other to exchange power transfer parameters and to monitor the power transfer.

A power supply that allows multiple reception devices to be placed on its interface surface for receiving power might not have enough power to serve all placed reception devices. This could for example be the case if the power is retrieved from a USB interface, which is limited to 2.5 W. In case sufficient power is not available, the voltage of the power supply could become too low for reception devices that need a certain voltage level to charge a battery. Moreover, the time to charge a battery could become (much) longer than expected. As another example, the reduction of power for a lighting application could lead to a reduction of the light output. As a consequence, the transmission of power from a transmission device to multiple devices with the aim to efficiently and safely serve as many reception devices as possible needs to be improved.

SUMMARY OF THE INVENTION

According to a first aspect of this invention, a method of transmitting power via electromagnetic coupling, from a transmission device to a set of reception devices is proposed. The method comprises the steps of:
  calculating by the transmission device, a first sum of given power levels defined by each of said set of reception devices;
  If a maximum power that can be transmitted by the transmission device to said set of reception devices is less than said first sum,
  determining by said transmission device, a subset of reception devices among said set of reception devices, to which the transmission device transmits power.

This invention also proposes some criteria about how to determine the charging order. For example, determine which reception devices can receive power according to the priority level of each reception device of said set of reception devices that defines the priority to receive power from the transmission device; or the criteria that determines which reception devices can receive power according to a time sequence in which the transmission device detects each reception device of said set of reception devices; or the criteria that determines which reception devices can receive power according to a maximum number of reception devices to which the transmission device can transmit power simultaneously, or the combination of aforementioned different criteria.

According to a second aspect of this invention, before abovementioned determining step, the method further comprises a step of identifying, among said set of reception devices, the reception devices defining a lower given power level. If there is at least one reception device that also defines a lower given power level, said transmission device performs said calculating step using the lower given power level instead of using the given power level defined by said at least one reception device; otherwise, said transmission device performs said step of determining.

By applying the first and second methods separately or together, the power can be utilized optimally.

According to a third aspect of this invention, the method further comprises a step of transmitting power by said transmission device to said subset of reception devices.

In this step, if an actual power level needed by a first given reception device among said subset of reception devices is below the given power level defined by said first given reception device, said transmitting step transmits power to said first given reception device according to said actual power level.

If an actual power level needed by a second given reception device among said subset of reception devices is above the given power level defined by said second given reception device, said transmitting step transmits power to said second given reception device according to the given power level defined by said second given reception device.

According to a fourth aspect of this invention, a method for further utilizing a first power amount is proposed. If a first power amount defined as said maximum power minus a second sum of given power levels defined by each reception device of said subset of reception devices is positive, and if there is at least one of said second given reception devices, said transmitting step transmits power to said at least one of said second given reception device according to the given power level defined by said at least one of said second given reception device and said first power amount.

According to a fifth aspect of this invention, a method for further utilizing a second power amount is proposed. When the second power amount defined as the given power level defined by said first given reception device minus said actual power level needed by said first given reception device is positive, the transmitting step transmits power to said second given reception device according to the given power level defined by said second given reception device and said second power amount. Said method further comprises a step of obtaining by said transmission device the actual power level needed by said first given reception device periodically, so as to update the value of said second power amount according to said obtained actual power level.

According to a sixth aspect of this invention, a method is proposed for defining a given power level for a reception device according to a minimum power level which is lower than the reception device's maximum required power level.

By applying this given power level, the transmission device can serve more reception devices as well as an acceptable quality.

According to a seventh aspect of this invention, a transmission control system is proposed for controlling a transmission device transmitting power via electromagnetic coupling to a set of reception devices, wherein said control system comprises a first unit for performing the abovementioned calculating step, a second unit for performing the abovementioned determining step and a third unit for performing the identifying step.

According to an eighth aspect of this invention, a transmission device is proposed for transmitting power via electromagnetic coupling from a transmission device to a set of reception devices, wherein said transmission device comprises the aforementioned transmission control system.

According to a ninth aspect of this invention, a method of transmitting power via electromagnetic coupling from a transmission device to a set of reception devices, said method comprising a step of sending, by at least one reception device of said set of reception devices, information of a given power level related to said at least one reception device, wherein said given power level is a minimum workable power level of said at least one reception device.

By communicating a minimum workable power level as the requested power level, the transmission device is also allowed to serve more reception devices with an acceptable quality.

BRIEF DESCRIPTION OF THE DRAWINGS

The above and other objects and features of the present invention will become more apparent from the following detailed description of the various aspects of the invention taken in conjunction with the accompanying drawings in which.

DETAILED DESCRIPTION OF THE INVENTION

In the following, the invention will be described by using one transmission device intended to transmit power to three reception devices, but it is to be understood that the invention could work similarly with a higher/lower number of reception devices.

Figure 1:
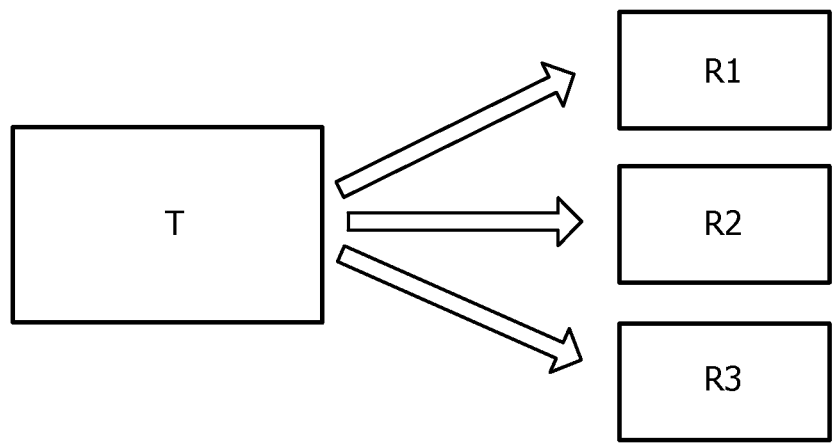
FIG. 1 depicts a wireless power transmission and receiving system.

FIG. 1 shows a wireless power transmission and reception system 10. The system 10 comprises a transmission device T which is capable of transmitting power wirelessly to multiple reception devices via electromagnetic coupling and a set of reception devices R1, R2 and R3 which are connected to the transmission device T. The reception devices R1, R2 and R3 are intended to be electrically charged by the transmission device T. Since transmission device T transmits power to R1, R2 and R3 wirelessly, R1, R2 and R3 being connected to T means that R1, R2 and R3 are very close to T so as to receive power from the electromagnetic field generated by T. For example, R1, R2 and R3 are put on the surface of the transmission device T.

Figure 2A:
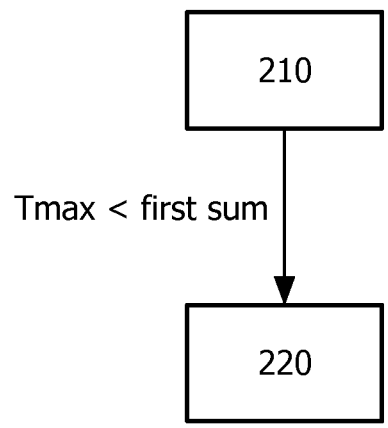
FIG. 2A depicts a flow chart according to an embodiment of this invention.

FIG. 2A shows a flow chart of the method according to the invention.

The reception devices R1, R2 and R3 are connected to the transmission device T for receiving power from the transmission device T.

Since there are three devices requesting power at the same time, in order to know whether the transmission device T can serve (i.e. transmit power to) all the receivers, firstly, the transmission device T performs a step 210 of calculating a first sum of the given power levels defined by each of said set of reception devices R1, R2 and R3.

Secondly, if a maximum power that can be transmitted by the transmission device T to the set of reception devices R1, R2 and R3 is less than the calculated first sum, the transmission device T performs a step 220 of determining a subset of reception devices to which the transmission device T transmits power among the set of reception devices R1, R2 and R3, based on the calculated first sum of given power levels and according to a set of criteria.

If R1, R2 and R3 are being connected to the transmission device T for requiring power, whilst device T does not transmit power to any reception device, the maximum power that can be transmitted by device T to R1, R2 and R3 is the maximum power of the transmission device T.

If R2 and R3 are being connected to the transmission device T for requiring power, whilst device T is transmitting power to R1, the maximum power that can be transmitted by device T to R2 and R3 (R2 and R3 are waiting for charging) is the maximum power of device T minus power used for the reception device R1.

For example, the transmission device T retrieves power from a USB interface which is limited to 2.5 W, meaning that the maximum power that can be transmitted by the transmission device T (referred to as Tmax) is 2.5 W;

The given power level defined by R1 (referred to as GR1) is 1.5 W;

The given power level defined by R2 (referred to as GR2) is 1.5 W;

The given power level defined by R3 (referred to as GR3) is 1 W.

The first sum of the given power levels defined by R1, R2 and R3 is GR1+GR2+GR3=4 W.

Obviously, the maximum power that can be transmitted by the transmission device T is lower than the first sum of the given power levels, meaning that the transmission device T cannot serve R1, R2 and R3 simultaneously. Therefore, the transmission device T performs a step 220 of determining which reception devices can be served among R1, R2 and R3. In the following, how the determining step 220 determines a subset of reception devices is described in detail.

To perform the determine step, the transmitter may predefine some criteria (rules) on how to determine.

According to an embodiment of this invention, a first criterion (rule) may be to determine according to the priority level of each reception device of said set of reception devices, said priority level defines the priority to receive power from the transmission device.

In the context of using the transmission device to charge the reception devices, a user may consider charging some reception devices more critical than charging others. For example, the user may want to charge a mobile phone as quickly as possible, but does not care very much about the charging speed of the controller of a game console.

It is possible for the user, when charging the mobile phone, to remove all other reception devices from the transmission device. However, in that case the user has to remember to put them back on the transmission device when the mobile phone has finished charging. It is not very convenient for the user.

Therefore, this invention proposes the determining step 220 to determine a charging sequence among a set of reception devices according to the priority level of the reception devices, so that the user does not need to remove the reception device with lower level priority and return it after the reception device with higher level priority is finished charging. The transmission device can determine which reception device to serve first according to the priority levels if the transmission device cannot serve all the reception devices at the same time, and can automatically start to serve the reception device with lower level priority after the reception device with higher level priority is served. The user convenience is therefore enhanced.

This can be realized by assigning a "priority" to each reception device, where reception devices with a higher priority take precedence over reception devices with a lower priority.

In the above example, if both R1 and R3 have higher priority than R2, then R1 and R3 are determined to be charged before R3.

There are two approaches to manage reception device priorities.

In the first approach, the reception device manages its own priority. For this purpose, it could have a (user) interface through which the priority may be set, or it could have a built-in (default) priority. In this approach, the reception device has to communicate its priority to the transmission device.

In the second approach, the transmission device manages the reception device priorities. For this purpose, it should have a (user) interface through which a list of device identifiers and the assigned priorities may be provided. In this case, when the transmission device detects a new reception device, it has to look up its priority based on the identifier supplied by the reception device.

Both approaches can be combined. The user interface of the transmission device can be applied to establish a priority for a detected reception device and then to communicate this priority to the reception device in order to set it into the reception device for later use.

According to another embodiment of this invention, a second criterion (rule) is to determine the subset of reception devices according to the time sequence in which the transmission device detects each reception device of said set of reception devices. From example, according to the time sequence the one who are detected firstly by the transmission device (i.e to be put on the surface of the transmission device firstly) will be powered first, i.e. first-come-first-serve criterion.

In abovementioned example, if the time sequence of the detection of the three reception devices from early to late is R2, R3, R1, according to the first-come-first-serve criterion, R2 and R3 will be served before R1.

Applying the first-come-first-serve criterion, may sometimes not be the optimal solution. For example, if in abovementioned example, the time sequence of detecting the three reception devices from early to late is R2, R1, R3, according to first-come-first-serve criterion, at first instance only R2 can be served, since R1 should be served earlier than R3, but the transmission device does not have enough power to serve R2 and R1 simultaneously.

To optimize the criteria of priority level and first-come-first-serve, this invention proposes a third criterion, which is to serve as many reception devices as possible. In other words, the third criterion is to determine the subset according to the maximum number of reception devices to which the transmission device can transmit power simultaneously. This criterion can be realized by first serving the reception devices with lower second power levels.

These three criteria can be mixed. As discussed in abovementioned example, if according to the second criterion, only reception device R2 can be served, the transmission device has to reserve (performing a reserving step) 1.5 W for serving R2, so the remaining power is 1 W. This remaining power is not sufficient to serve R1, but it can serve R3 which should be served later than R1 according to the second criterion. According to the mixed second and third criteria, the transmission device can determine to serve R2 and R3 simultaneously. In this example, the transmission device T first applies the second criterion, and then applies the third criterion for the remaining power.

For another example, the criteria may be the mix of the first and second criteria. The transmission device may first use the first criterion, and for the reception devices with the same priority, the transmission device may apply the second or the third criterion to determine which reception devices to serve.

When performing the determining step 220, a subset of reception devices is determined. Then, the transmission device is configured according to the given power levels defined by each reception device of said subset of reception devices. There are two approaches to specify the given power level.

The first approach is to specify the given power level of a reception device according to the maximum power level required by such reception device, so as to make sure that the reception device can be served at the maximum power level during the transmission process. In other words, the transmission device reserves its power for the reception device according to the maximum power level required by the reception device.

In the context of this invention, to reserve power for a certain reception device means that when calculating the maximum power that can be transmitted by the transmission device to the other reception devices, this power amount cannot be taken into account as available to serve other reception devices, no matter how much power such certain reception device actually consumes. In other words, the transmission device shall always be available for transmitting power to certain reception device with a given power level.

In the context of this invention, the maximum power level required by a reception device means the maximum power that the reception device might use (consume) during the transmission process; it is also referred to as "maximum required power".

The advantage of this approach is that the reception device can be charged as quickly as possible, i.e. the transmission duration can be minimized. A disadvantage is that during the transmission process, a reception device may not always consume the maximum requested power. For example, to charge a battery, a constant voltage is required by the battery, the current inducted in the coil of the reception device changes in time, and the power consumed by the reception device therefore changes corresponding to the change of the current. There is only a very short period in which the reception device needs the maximum power.

This is certainly not very efficient for the transmission device that needs to serve multiple reception devices since the power is reserved for a reception device according to its maximum power level no matter how much power the reception device actually consumes, and the reserved but not consumed power cannot be used by other reception devices. It wastes the capacity of the transmission device to serve multiple reception devices simultaneously.

In order to overcome the abovementioned disadvantage and to serve as many reception devices as possible, as well as to ensure the quality of the transmission, instead of using the maximum power level of a given device as the given power level, this invention proposes a second approach to specify the given power level of a reception device based on a minimum workable power level, i.e. the given power level is a minimum power level at which the reception device can be charged successfully or is workable (for a light source, for example).

The given power level of a reception device is thus lower than the maximum power level required by this reception device according to this invention.

The given power level can be determined according to the type of the reception device and some other parameters, such as the requirement of transmission duration, etc. It could be the maximum power that the reception device might consume during the transmission process, it could also be a rated power of a reception device, or it could be a value between the maximum and minimum power level that the reception device might consume.

As a first example, for a battery, the maximum power that the battery might consume during the transmission process is 8 W and the minimum power that the battery might consume during the transmission process is 2 W. To optimize the use of power, the given power level defined by the battery could be for example 6 W. If it allows a slower charging speed and provided that the charging process can be implemented successfully, the given power level of the battery can also be defined as 5 W or 4 W.

As a second example, a lighting source needs a constant power for emitting light stably. The given power level of the lighting source has to be the rated power or at least a minimum workable power level.

The information of the given power level defined by a reception device according to this invention can be communicated from the reception device to the transmission device using any known communication technology; it also can be determined by the transmission device according to the type of the reception device and other information from the reception device.

Since the given power level is used to configure the transmission device so that the transmission device can reserve power for the relevant reception device, as a consequence, no matter how much power the reception device actually consumes, the transmission device has to guarantee that it always can transfer this amount of power. In other words, the transmission device has to keep capability to provide power to the reception device according to the given power level. Since the given power level is requested by the reception device, term "given power level" is also referred to as a "requested guaranteed power level".

Since the invention proposes to specify a given power level of a reception device according to a minimum chargeable or workable power level instead of using the maximum required power level, in the transmission duration, the transmission device will not reserve power according to the maximum required power level but according to a minimum chargeable or workable power level of the reception device. This change causes the transmission device to have the capability to serve multiple reception devices at the same time, as well as to maintain an acceptable transmission quality regarding the charging time and the charging power.

Although this approach may increase the charging time of the firstly placed reception device(s), it decreases the total waiting time.

Figure 2B:
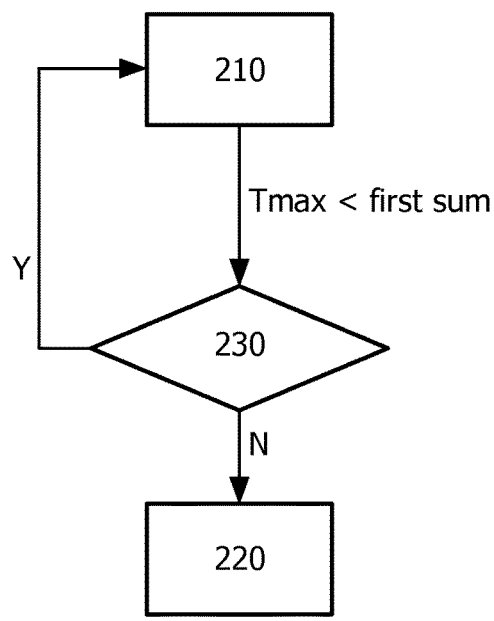
FIG. 2B depicts a flow chart according to another embodiment of this invention.

As shown in FIG. 2B, according to an embodiment of this invention, if a reception device allows at least two minimum workable power levels (meaning that the given power level has at least two values), the power transmission can be further optimized to simultaneously serve as many reception devices as possible.

In order to apply the further optimization, before performing determining step 220, said method further comprises a step 230 of identifying, among said set of reception devices, the reception devices that defines both a given power level and a lower given power level; if there is at least one reception device that defines both a given power level and a lower given power level, the transmission device performs said calculating step using the lower given power levels instead of using the given power levels defined by said at least one reception device; otherwise, the transmission device performs determining step 220.

Still using above example as the background to explain step 230, wherein Tmax is 2.5 W, the given power levels of the reception devices R1, R2 and R3 is defined as follows:
GR1: 1.5 W, 1 W;
GR2: 1.5 W, 1 W;
GR3: 1 W.

The first sum of the given power levels is 4 W, which is more than Tmax. The transmission device T performs step 230 to identify which devices allow a lower given power level, compared to the given power level which is used by the previous calculation step 210. The identifying result is that R1 and R2 allow a lower given power level, wherein GR1 allows 1 W, GR2 allows 1 W.

The transmission device then performs the calculating step 210 for the second time, now using the allowed lower given power levels. The new calculated first sum of the given power levels is: GR1+GR2+GR3=1 W+1 W+1 W=3 W.

Tmax is still less than the new calculated first sum.

The transmission device then performs identifying step 230 for the second time. There are no devices that allow a lower given power level than the given power level used in previous calculation step; the transmission device then goes to step 220 for determining a subset of reception devices to serve.

If the parameters of given power levels of the three reception devices are as follows:
GR1: 1.5 W, 1 W;
GR2: 1.5 W, 1 W, 0.5 W;
GR3: 1 W,
then in the second identifying step, R2 is found to allow a lower given power level (i.e. 0.5 W) than the given power level used in the previous calculation step (i.e. 1 W).

The transmission device then performs the calculation step 210 for the third time, now using the allowed lower given power level (i.e. 0.5 W). The new calculated first sum of given power levels is: GR1+GR2+GR3=1 W+1 W+0.5 W=2.5 W.

Tmax is equal to the latest calculated first sum, which means that the transmission device T is capable of serving the three reception devices at their lower given power level.

By performing this identifying step 230, the transmission device can further manage the situation when the power is not sufficient to serve multiple reception devices to optimally utilize the power which can be provided by the transmission device.

Figure 2C:
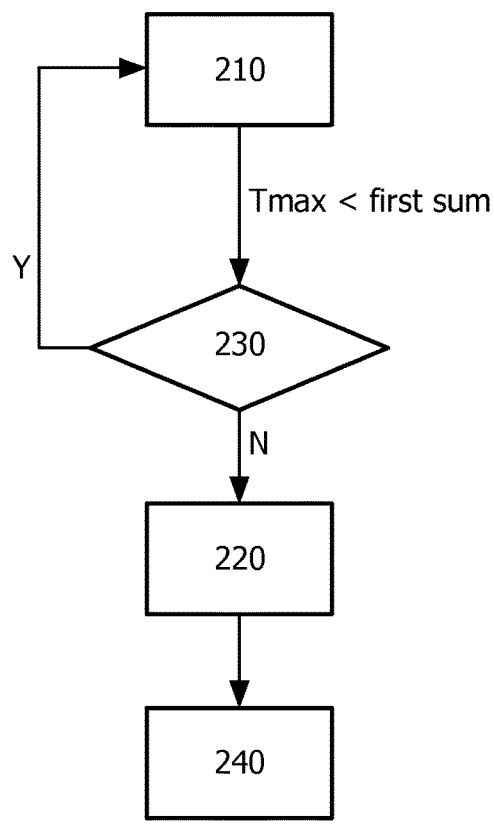
FIG. 2C depicts a flow chart according to another embodiment of this invention.

As shown in FIG. 2C, after the determining step 220, the transmission device T can be configured according to the given power levels defined by each of said subset reception devices. And then the transmission device T performs a transmitting step 240 for transmitting power to the determined subset of reception devices.

When an actual power level needed (consumed) by a first given reception device among said subset of reception devices is below the given power level defined by said first given reception device, said transmitting step 240 transmits power to said first given reception device according to said actual power level. As described above, during the power transmission process, the transmission device reserves power according to the given power levels defined by each reception device of said subset of reception devices. Therefore, as long as the actual power level needed by each first given reception device is lower than its given power level, the actual needs can be served.

On the contrary, when an actual power level needed by a second given reception device among said subset of reception devices is above the given power level defined by said second given reception device, said transmitting step transmits power to said second given reception device according to the given power level defined by said second given reception device. In other words, the transmission device cannot guarantee the power requirement above the given power level.

According to another embodiment of this invention, when performing the transmission step 240, if a first power amount defined as said maximum power minus a second sum of given power levels defined by each reception device of said subset of reception devices is positive, then the first power amount can be used to transmit to the reception device of which the actually needed power level is above its given power level.

In the following, "first given reception device" refers to the reception device of which the actually needed power level is below its given power level.

"Second given reception device" refers to the reception device of which the actually needed power level is above its given power level.

Then, the transmitting step 240 transmits power to at least one of said second given reception devices according to the given power level defined by said at least one of said second given reception devices and said first power amount.

According to the definition, the first power amount is the surplus power that is not reserved for the reception devices being served. Therefore, the first power amount can be deemed as a maximum power that the transmission device can transmit to the reception devices which are waiting for power. But when there is no reception device that is waiting for charging or the first power amount cannot meet the requirement of the reception device which is waiting for power, the first power amount can be used for the reception devices being served.

In the above example, wherein Tmax is 2.5 W, now the given power levels of the reception devices R1, R2 and R3 are as follows:
GR1: 0.5 W;
GR2: 1.5 W;
GR3: 2.5 W.

If the transmission device follows the criterion of priority level, the priority sequence of R1, R2 and R3 from high to low is R2>R1>R3. According to above described determining step, the transmission device can transmit power to R2 and R1. In this circumstance, the first power amount is: Tmax−GR2−GR1=2.5 W−1.5 W−0.5 W=0.5 W.

R3 cannot be served with 0.5 W. If at least one of the given power levels of R2 and R1 is defined by their minimum workable power level instead of their maximum required power level, it may happen that the actually needed power level for R2 or R1 is above the given power level defined by R2 or R1. In this scenario, the first power amount can be used by R2 and/or R1. But this surplus power cannot be reserved for R2 and R1.

When a new reception device is being detected, the transmission device will check the parameter of the newly detected reception device to determine if the first power amount can fulfill the requirement of new reception device.

If, for example, the newly detected reception device allows a given power level of 0.5 W, then the transmission device will start to transmit power to the newly detected reception device.

If the given power level of the newly detected reception device is above 0.5 W, the first power amount cannot serve the newly detected reception device, so the first power amount still can be used by R2 and R1.

If there are multiple second given reception devices, the first power amount can be used to transmit to at least one of the second given reception devices according to predefined rules.

According to another embodiment of this invention, the first power amount is transmitted to multiple second given reception devices according to predefined rules.

A first predefined rule may be, for example: said first power amount can be transmitted in equal parts to the reception devices which need the first power amount.

According to the first rule, in above example, a half of 0.5 W power can be assigned and transmitted to both R2 and R1 respectively, i.e. 0.25 W to R1, 0.25 W to R2.

A second predefined rule may be: the first power amount can be transmitted in proportional parts to the reception devices which need the first power amount.

If the second rule is applied to above example, ¼ of 0.5 W can be assigned to R1 and ¾ of 0.5 W can be assigned to R2.

A third predefined rule may be: said first power amount can be transmitted according to the priority levels of the reception devices which need the first power amount.

A fourth predefined rule may be: assigning said first power amount according to the priority level of each reception device of said subset of reception devices.

When applying the third rule to above example, the first power amount is first used to meet the requirement of R2, which has a higher priority than R1. For example, if R2 needs 0.4 W more than the given power level defined by R2, then the transmission device can supply the given power level plus 0.4 W to R2, i.e. 1.9 W is transmitted by the transmission device to R2. The remaining 0.1 W can be used for R1's additional requirement.

It is to be understood that, although the first power amount can be used to meet the requirement of transmitting more power than the given power levels of the reception devices being served, the first power amount is assigned and transmitted only when there is a real need by the reception devices being served.

It is also to be understood that the transmission device controls the transmission upper limit according to the maximum required power of the reception devices being served. Therefore, besides applying above rules in the assignment of the first power amount, the upper limit of the transmission power may also need to be taken into account.

As discussed above, when the transmission device transmits power to the subset of reception devices, some of the reception devices being served do not consume the maximum required power. Also, some of the reception devices being served sometimes consume less power than their given power levels.

According to another embodiment of this invention, a solution is proposed to utilize a second power amount. The second power amount is defined as the given power level, defined by a first given reception device, minus the power level that is actually needed by said first given reception device.

The second power amount is different from the first power amount. The first power amount refers to the power that is not reserved for the reception devices being served. The second power amount refers to the power that is reserved for a given reception device being served but is not consumed by this given reception device.

If a second power amount of a given reception device is positive, the second power amount of this given reception device can be transmitted to the second given reception device which needs more power than the given power level defined by the second given reception device.

Since the power that is actually needed by the second given reception device may change in time, it is proposed to let the transmission device periodically perform a step of obtaining the actual level of power that is needed by said first given reception device, so as to update the value of said second power amount according to said obtained actual power level.

For example, when the power that is actually needed by the second given reception device is increased, the second power amount is decreased accordingly. In such a way, a part of or the entire second power amount of the second given reception device can "return" to the second given reception device.

Still using above transmission system as example, wherein Tmax is 2.5 W, the given power levels of the reception devices R1, R2 and R3 now are as follows:
GR1: 1 W;
GR2: 1 W;
GR3: 0.5 W.

According to the given power levels defined by R1, R2 and R3 and the maximum power of the transmission device, all the reception devices R1, R2 and R3 can be served simultaneously. At a certain time of the power transmitting period, the actual power needed by R1 is 0.8 W, so the second power amount of R1 is 0.2 W. This second power amount can be transmitted to R2 if R2 requires more power than 1 W. For example, if R2 requires 1.3 W, the transmission device can transmit 1.2 W to R2. In this example, R2 is a "second given reception device" and R1 is a "first given reception device".

If there are multiple second given reception devices that actually need more power than their given power levels, the second power amount is transmitted to said multiple second given reception devices according to a predefined rule, defined as follows:
said second power amount can be transmitted in equal parts to the reception devices which need the second power amount equally; or
said second power amount can be transmitted in proportional parts to the reception devices which need the second power amount; or
said second power amount can be transmitted according to the priority levels of the reception devices which need the second power amount.

These rules are similar to abovementioned rules for distributing the first surplus power. Therefore, no more details will be given.

Figure 3A:
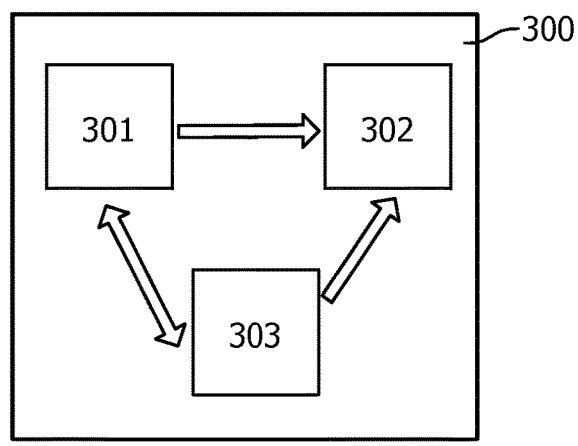
FIG. 3A depicts a block diagram of a transmission control system according to an embodiment of this invention.
Figure 3B:
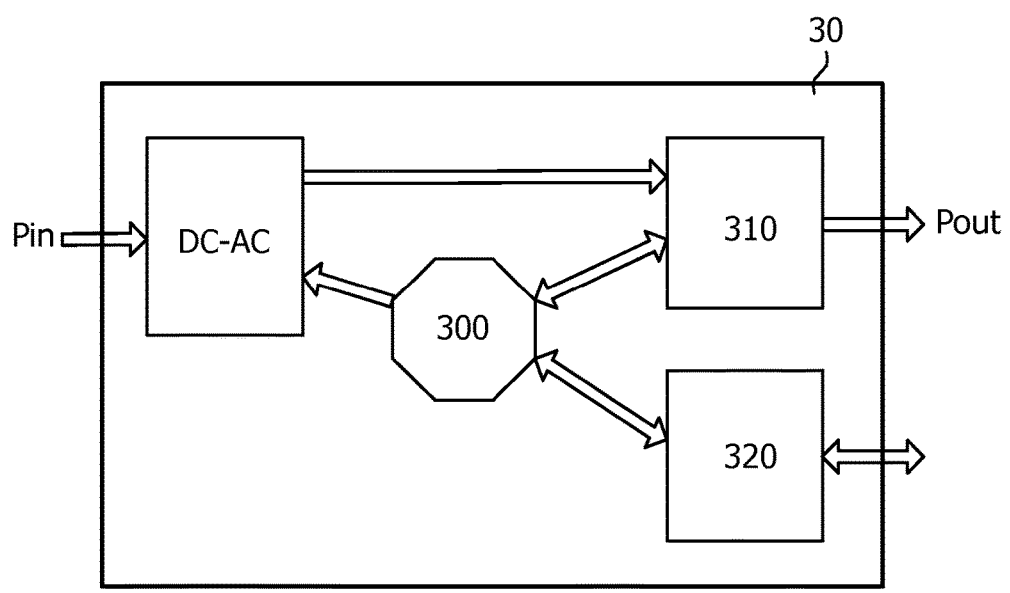
FIG. 3B depicts a block diagram of a transmission device according to an embodiment of this invention.

As shown in FIG. 3, a transmission control system 300 is proposed for controlling a transmission device transmitting power to a set of reception devices via electromagnetic coupling.

The transmission control system 300 comprises a first unit 301 for performing aforementioned calculating step 210; a second unit 302 for performing the aforementioned determining step 220 when a maximum power that can be transmitted by said transmission device to said set of reception devices is less than said first sum.

The transmission control system 300 also comprises a third unit 303 for performing aforementioned identifying step 230 so that, if there is at least one reception device defining a lower given power level, said first unit performs said calculating step using the lower given power level instead of using the given power level defined by said at least one reception device; otherwise, said second unit performs said determining step.

The first unit 301, the second unit 302 and the third unit 303 can be implemented each by a memory with stored instruction data. These three units can also be implemented by a memory associated with three specific instruction data sets.

These units may also be implemented by one or multiple printed circuit boards or by one or multiple processors. The transmission control system 300 thus may be a PCB or a chip or another type of hardware.

There are numerous ways of implementing functions by means of items of hardware or software, or their combination. In this respect, the drawings are merely illustrative, each representing only one possible embodiment of the invention.

This invention also proposes a transmission device 30 for transmitting power to a set of reception devices via electromagnetic coupling. The transmission device 30 comprises a transmission control system 300 having abovementioned functions.

The transmission device 30 also comprises a transmission element 310 for transmitting power to said subset of reception devices. The transmission element 310 is controlled by the transmission control system 300.

If an actual power level needed by a first given reception device among said subset of reception devices is below the given power level defined by said first given reception device, the transmission element 310 transmits power to said first given reception device according to said actual power level.

If an actual power level needed by a second given reception device among said subset of reception devices is above the given power level defined by said second given reception device, said transmission element 310 transmits power to said second given reception device according to the given power level defined by said second given reception device.

According to the description above, a first power amount is defined as the maximum power of the transmission device 30 minus a second sum of given power levels defined by each reception device of the subset of reception devices which currently are being served. If the first power amount is positive, and if there is at least one of the second given reception devices, the transmission element 310 is controlled to transmit power to at least one of the second given reception devices according to the given power level defined by said at least one of said second given reception devices and said first power amount.

According to the invention, the transmission element 310, controlled by the transmission control system 300, transmits power to the second given reception device according to the given power level defined by the second given reception device and said second power amount.

The transmission element 310, that is capable of transmitting power to multiple reception devices, can be implemented according to any known technology. For example, the transmission element 310 can be implemented by multiple transmitter coils to generate a magnetic field that fits to multiple reception devices, each of them having a receiver coil. It could also contain regulation facilities, such as a DC-AC convertor, an AC generator, etc.

As described above, the second power amount is defined as the given power level defined by said first given reception device minus said power level that is actually needed by said first given reception device.

The transmission device comprises a communication element 320 for periodically obtaining the power level that is actually needed by the first given reception device, so as to update the value of the second power amount according to the obtained actual power level.

The communication element 320 can be implemented by any known technology, such as NFC or RFID, or it could also be implemented by the transmitter coil.

The remarks made hereinbefore demonstrate that the detailed description with reference to the drawings, illustrate rather than limit the invention. There are numerous alternatives, which fall within the scope of the appended claims. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps.

The invention claimed is:

1. A method of transmitting power via electromagnetic coupling from a transmission charging device to a set of reception devices, wherein each reception device defines a first given power level specifying a power requirement required by each reception device, the method comprising:
    calculating by the transmission charging device, a first sum of the first given power levels defined by each reception device of the set of reception devices; and
    when a maximum power that can be transmitted by the transmission charging device to the set of reception devices is less than the first sum,
        identifying, among the set of reception devices, whether there are any reception devices defining a second given power level which is lower than its first given power level; and
        determining by the transmission charging device, according to the identifying and a predetermined criteria, a subset of reception devices among the set of reception devices, to which the transmission charging device transmits power.

2. The method according to claim 1, wherein the subset of reception devices is further determined according to at least one of the following:
    a priority level of each reception device of the set of reception devices, the priority level defining the priority to receive power from the transmission charging device;
    a time sequence in which the transmission charging device detects each reception device of the set of reception devices; and
    a maximum number of reception devices to which the transmission charging device can transmit power simultaneously.

3. The method according to claim 1, wherein the method further comprises reserving power for each reception device of the subset of reception devices according to the second given power level for each reception device of the subset of reception devices respectively.

4. The method according to claim 3, wherein the second given power level defined by at least one reception device of the set of reception devices is a minimum workable power level of the at least one reception device.

5. The method according to claim 1, wherein the method further comprises:
    transmitting power by the transmission charging device to the subset of reception devices, wherein,
    when an actual power level needed by a first reception device among the subset of reception devices is below the second given power level defined by the first reception device, power is transmitted to the first reception device according to the actual power level; and
    when the actual power level needed by a second reception device among the subset of reception devices is above the second given power level defined by the second reception device, power is transmitted to the second reception device according to the second given power level defined by the second reception device.

6. The method according to claim 5, wherein when a first power amount defined as the maximum power minus a second sum of the second given power levels defined by each reception device of the subset of reception devices is positive, and when there is at least one of the second reception devices, power is transmitted to the at least one of the second reception devices according to the second given power level defined by the at least one of the second reception devices and the first power amount.

7. The method according to claim 5, wherein when the actual power level needed by the second reception device among the subset of reception devices is above the second given power level defined by the second reception device, periodically obtaining, by the transmission charging device, the actual power level needed by the first reception device, so as to update a value of a second power amount according to the obtained actual power level, the second power amount being defined as the second given power level defined by the first reception device minus the actual power level needed by the first reception device.

8. The method of claim 1 wherein at least one reception device of the set of reception devices sends information of the second given power level related to the at least one reception device, and wherein the second given power level is a minimum workable power level of the at least one reception device.

9. A transmission control system for controlling a transmission charging device transmitting power to a set of reception devices via electromagnetic coupling, wherein each reception device defines a first given power level specifying a power requirement required by each reception device, the transmission control system comprising:

a first processing circuit configured to calculate, by the transmission charging device, a first sum of the first given power levels defined by each reception device of the set of reception devices;

a second processing circuit configured to identify, among the set of reception devices, whether there are any reception devices defining a second given power level which is lower than that reception device's first given power level; and a third processing circuit configured to determine, according to the identifying, a subset of reception devices among the set of reception devices to which the transmission charging device transmits power.

10. The transmission control system according to claim 9, wherein the third processing circuit is further configured to determine the subset of reception devices according to at least one of the following:

a priority level of each reception device of the set of reception devices, the priority level defining the priority to receive power from the transmission charging device;

a time sequence in which the transmission charging device detects each reception device of the set of reception devices; and a maximum number of reception devices to which the transmission charging device can transmit power simultaneously.

11. The transmission control system according to claim 9, wherein the transmission charging device further comprises a transmission element for transmitting power to the subset of reception devices, wherein, when an actual power level needed by a first reception device among the subset of reception devices is below the second given power level defined by the first reception device, the transmission element transmits power to the first reception device according to the actual power level; and when an actual power level needed by a second reception device among the subset of reception devices is above the second given power level defined by the second reception device, the transmission element transmits power to the second reception device according to the second given power level defined by the second reception device.

12. The transmission control system according to claim 9, wherein when a first power amount defined as the maximum power minus a second sum of the second given power levels defined by each reception device of the subset of reception devices is positive, and when there is at least one of the second reception devices, the transmission charging device transmits power to the at least one of the second reception devices according to the second given power level defined by the at least one of the second reception devices and the first power amount.

13. A transmission charging device to transmit power to a set of reception devices via electromagnetic coupling wherein each reception device defines a first given power level specifying a power requirement required by each reception device, the transmission charging device comprising:

a first circuit configured to calculate a first sum of the first given power levels defined by each reception device of the set of reception devices wherein when a maximum power that can be transmitted by the transmission charging device to the set of reception devices is less than the first sum, identifying, among the set of reception devices, whether there are any reception devices defining a second given power level which is lower than that reception device's first given power level, and a second circuit configured to determine, according to the identifying and a predetermined criteria, a subset of reception devices among the set of reception devices to which the transmission charging device transmits power.

14. The transmission charging device of claim 13, further comprising:

a receiver configured to receive from at least one reception device of the set of reception devices information of the second given power level related to the at least one reception device, and wherein the second given power level is at least one of a minimum workable power level of the at least one reception device.

15. The method according to claim 1 further comprising:
receiving information related to the first given power level from each reception device; and
receiving information related to the second given power level from each reception device that defines the second given power level.

* * * * *